US005492217A

United States Patent [19]
Stewart

[11] Patent Number: 5,492,217
[45] Date of Patent: Feb. 20, 1996

[54] CENTER DRIVE PORTABLE AUGER

[75] Inventor: Ronald S. Stewart, Rock Rapids, Iowa

[73] Assignee: Sudenga Industries, Inc., George, Iowa

[21] Appl. No.: 291,169

[22] Filed: Aug. 16, 1994

[51] Int. Cl.⁶ ..................................... B65G 33/14
[52] U.S. Cl. ........................ 198/667; 198/674; 414/300
[58] Field of Search .................... 414/299–302, 414/310, 319, 326, 526; 198/569, 667, 666, 672, 674

[56] References Cited

U.S. PATENT DOCUMENTS

| | | | |
|---|---|---|---|
| 2,103,145 | 12/1937 | Carter | 198/672 X |
| 2,610,727 | 9/1952 | Beldin | 198/667 |
| 2,769,526 | 11/1956 | Hersovitch | 198/674 X |
| 2,998,123 | 8/1961 | Kooiker | 198/667 |
| 3,189,168 | 6/1965 | Coats et al. | 198/672 X |
| 3,198,320 | 8/1965 | Mayrath et al. | 198/667 |
| 3,379,301 | 4/1968 | Kopaska | 198/667 |
| 4,142,621 | 3/1979 | Oliver | 198/666 X |
| 4,440,539 | 4/1984 | Sullivan | 414/299 X |
| 4,963,066 | 10/1990 | Boppart | 414/526 X |

OTHER PUBLICATIONS

*Soybean Digest*, advertisement for Mayrath Industries, Inc.'s In Line Drive Auger, Aug./Sep. 1993, p. 29.

Four Star, Inc., advertisement for Unique Auger/Elevator.

*Primary Examiner*—Michael S. Huppert
*Assistant Examiner*—James W. Keenan
*Attorney, Agent, or Firm*—Kinney & Lange

[57] ABSTRACT

A center drive portable auger system for transporting particulate material. The auger includes an auger tube having a feed end and a discharge end, an auger drive shaft within the auger tube, and an auger flighting mounted to the auger drive shaft for transporting particulate material from the feed end to the discharge end of the auger tube. A gear box is positioned adjacent an external surface of the auger tube between the discharge end and the feed end for center driving the auger flighting. Since the central gear is external to the auger tube it does not restrict the flow of the particulate material within the auger tube, does not leak oil into the particulate material, and runs cooler than the internal gear boxes due to less friction during operation. A drive linkage operates between the gear box and the auger drive shaft for driving the auger flighting.

19 Claims, 3 Drawing Sheets

CENTER DRIVE PORTABLE AUGER

BACKGROUND OF THE INVENTION

The present invention relates to a portable auger for transporting particulate material, and more particularly, to a portable auger having a center drive connectable to a power take-off (PTO) of a tractor or other power source.

Portable augers having central drive linkages are well known in the art. Center drive portable augers include an internal gear box mounted in line with an auger flighting such that the gear box is totally enclosed within an auger tube. Typically, the diameter of the auger tube around the internal gear box is expanded to facilitate easy passage of the particulate material past the internal gear box. Additionally, a telescoping power take-off or other power source can be used on either side of the auger tube for convenience of the operator. However, internal gear boxes often leak oil into and contaminate the particulate material. Also, friction of the particulate material past the internal gear box causes the gear box to run hot thereby decreasing the effective life of the gear box and again leading to oil leakages.

External gear boxes are known for "top driven" auger flights. In top driven augers the gear box is positioned on an external surface of the auger tube near the feed end since the feed end is closer to the power-take-off (PTO) of the tractor. An output shaft extends from the external gear box up the entire length of the auger tube to the discharge end thereof. Typically, a chain and sprocket at the discharge end of the auger tube connects the output shaft to the drive shaft of the auger flighting.

External gear boxes have also been used with "bottom driven" auger flights wherein a separate feed auger is provided to dispense particulate material into a main auger tube. In such an arrangement, the main auger tube typically is bottom driven through the external gear box and the feed auger is typically top driven through an external gear linkage.

SUMMARY OF THE INVENTION

The present invention relates to a center drive portable auger system for transporting particulate material. The auger includes an auger tube having a feed end and a discharge end, an auger drive shaft within the auger tube, and an auger flighting mounted to the auger drive shaft for transporting particulate material from the feed end to the discharge end of the auger tube. A gear box is positioned adjacent an external surface of the auger tube between the discharge end and the feed end for center driving the auger flighting. Since the central gear is external to the auger tube it does not restrict the flow of the particulate material within the auger tube, does not leak oil into the particulate material, and runs cooler than the internal gear boxes due to less friction during operation. A drive linkage operates between the gear box and the auger drive shaft for driving the auger flighting.

In a preferred embodiment the drive linkage includes a sprocket mounted between two sections of the auger flighting and a drive chain extending between the sprocket and the external gear box. A drive tube is sealed around the sprocket and to the auger tube such that particulate material cannot contact the drive chain or sprocket and such the particulate material is contained within the auger tube.

DETAILED DESCRIPTION OF THE PREFERRED EMBODIMENTS

Figure 1:
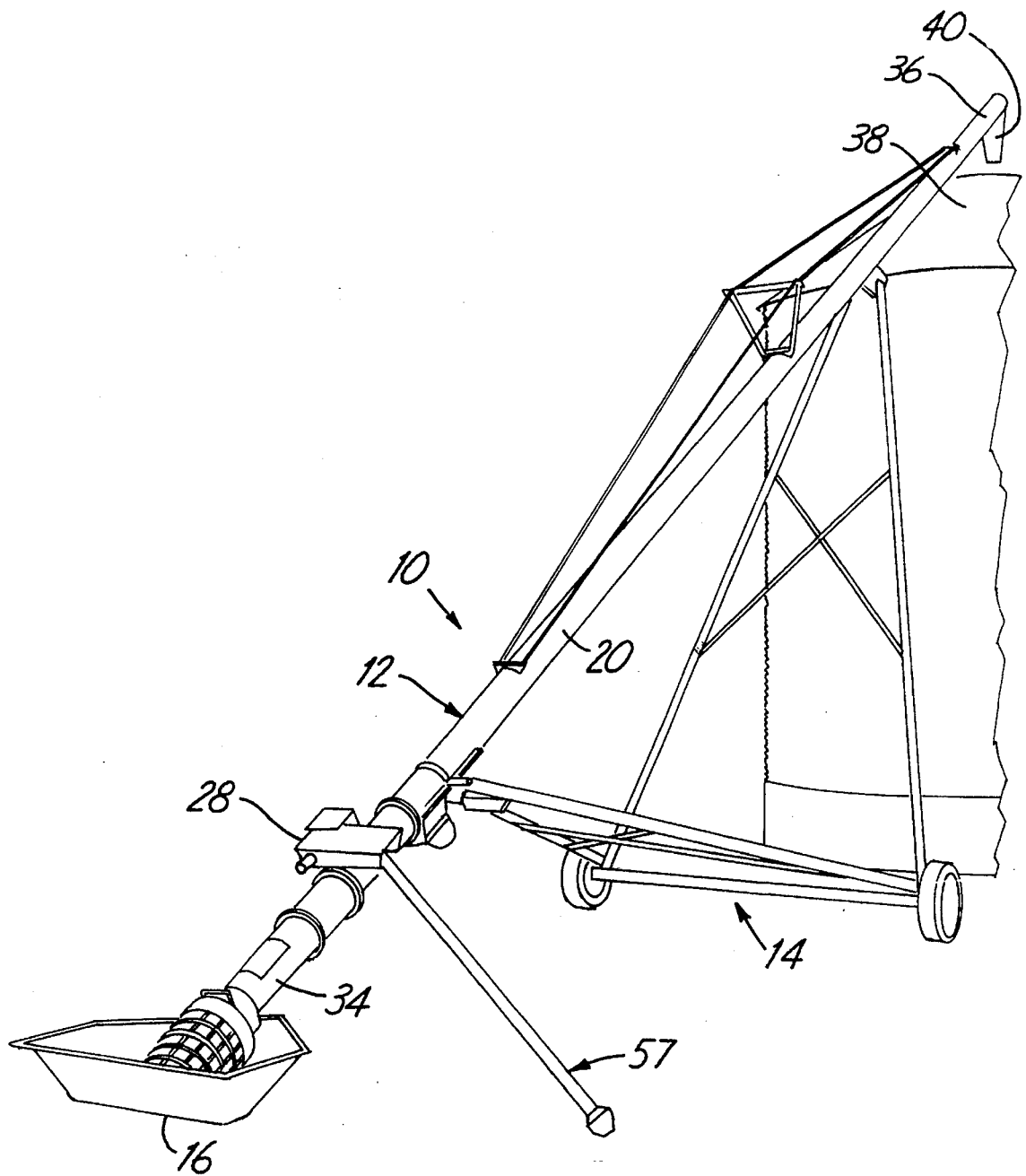
FIG. 1 is a perspective view of a center drive portable auger with external gear box in accordance with the present.

The center drive portable auger system, generally indicated at 10, in FIG. 1, includes a center drive auger 12, a frame assembly 14, and a hopper 16. The auger system 10 is typically used for transporting grain, but may be used for transporting any particulate material.

The frame assembly 14 and the hopper 16 are well known to those skilled in the art and may be of any known construction.

Figure 2:
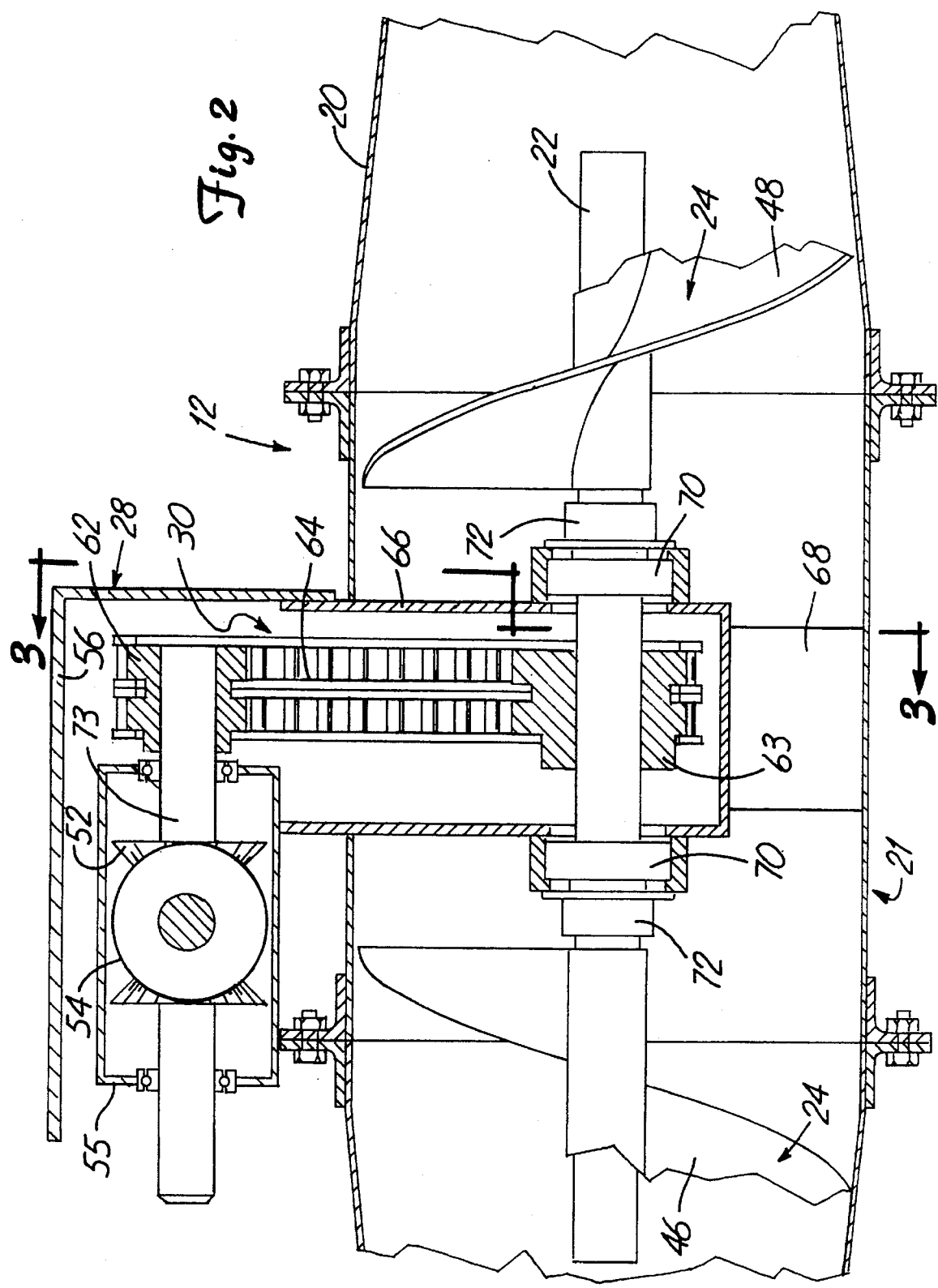
FIG. 2 is an elevational view of the drive section of the auger with portions of the auger tube broken away.

Referring to FIGS. 1 and 2, the center drive portable auger 10 includes an auger tube 20, an auger drive shaft 22, an auger flighting 24, an external gear box 28, and a drive linkage 30. The auger tube 20 has a feed end 34 for receiving particulate material from the hopper 16 and a discharge end 36 for expelling the particulate material into a storage bin 38 or the like. Preferably, a center section 21 (see FIG. 2) of the auger tube adjacent the drive linkage 30 has an increased diameter compared to the rest of the auger tube. The increased diameter of the center section 21 permits increased grain flow past the drive linkage 30. A discharge spout 40 is provided at the discharge end 36 of the auger tube 20 for directing the particulate material in a defined path into the storage bin 38. Preferably, the auger tube 20 is constructed of cold drawn 14 gauge steel with prewelded hook ups for trussing and transport.

The auger flighting 24 is a helical screw thread mounted to the auger drive shaft 22 for transporting the particulate material from the feed end 34 to the discharge end 36 of the auger tube 20. The auger flighting 24 includes a first section 46 mounted between the feed end 34 of the auger tube and the drive linkage 30, and a second section 48 mounted between the drive linkage 30 and the discharge end 36 of the auger tube. Preferably, the auger flighting 24 is constructed of 14 gauge steel having a thickness of 3/16" and a radius of 1½".

The gear box 28 is positioned adjacent an external surface of the auger tube 20 and is of well known construction to those skilled in the art. The external gear box 28 is available, for example, from Superior Gear Box of Stockton, Mo., in the "400 Series". The external gear box 28 includes a pair of miter or beveled gears 52 and 54, a gear support 55 for supporting the miter gears 52 and 54, and a housing 56. The miter gears 52 and 54 must be maintained in a lubricated state for proper and efficient operation in transferring power from the PTO through the drive linkage 30 to the auger drive shaft 22. The miter gear 52 is also equipped with a universal joint 57 for engaging the PTO.

The external gear box 28 of the center driven auger system 10 prevents oil in the gear box 28 from leaking into the particulate material in the auger tube 20 and permits the gear box 28 to run cooler than if it was positioned inside the auger tube 20. Additionally, the external gear box 28 does not restrict the flow of the particulate material within the auger tube 20. The gear box 28 is positioned approximately between the first section 46 and second section 48 of the auger flighting 24 to minimize the length of the drive linkage 30 between the gear box 28 and the auger drive shaft 22. The gear box 28 is connectable to an external power supply such as a power take-off shaft (PTO) on a tractor vehicle for driving the auger drive shaft 22. The speed of rotation of the PTO controls the speed of the auger drive shaft 22.

Figure 3:
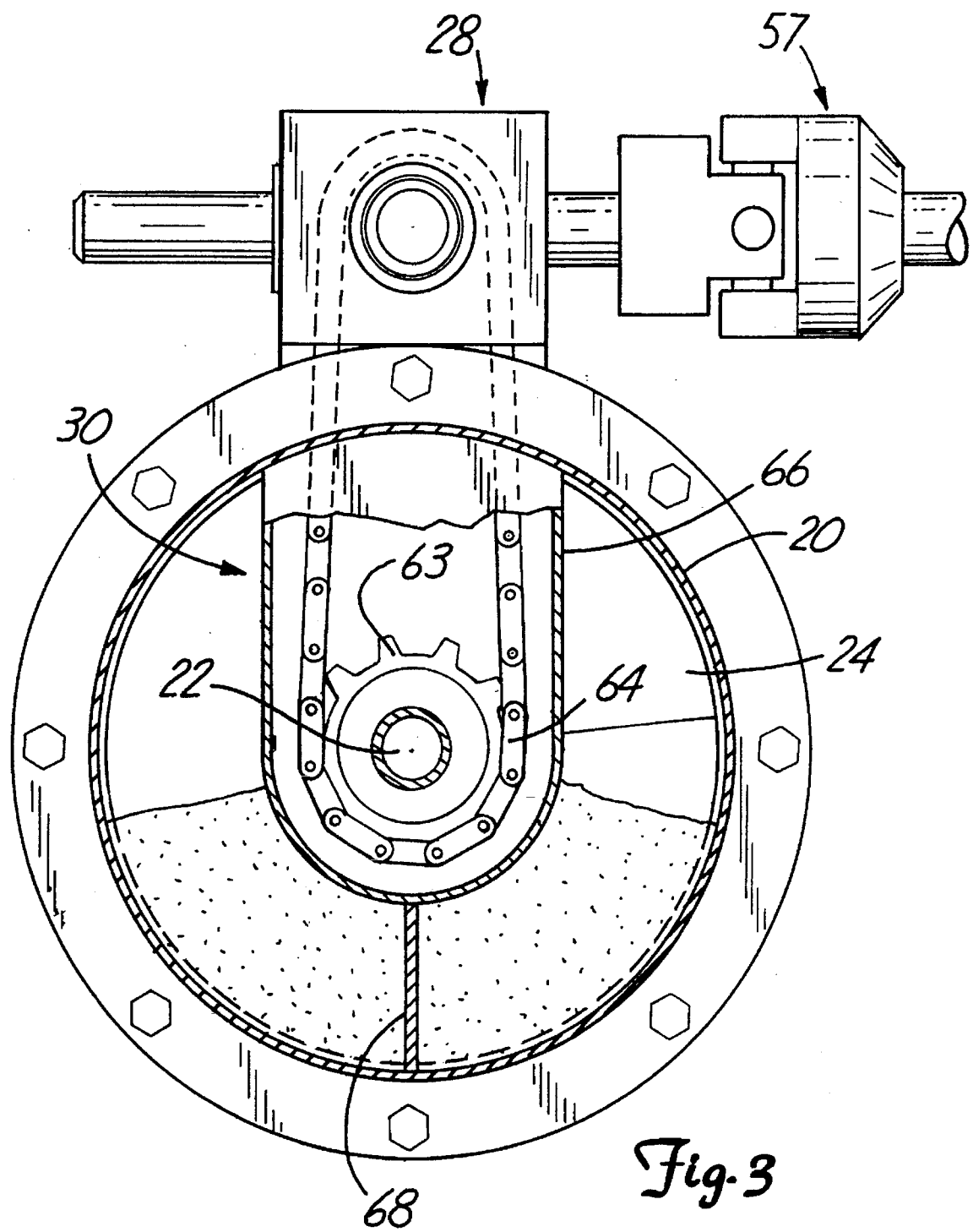
FIG. 3 is a sectional view taken along lines 3—3 of FIG. 2.

Referring to FIGS. 2 and 3, the drive linkage 30 includes a pair of sprockets 62 and 63, a roller chain 64, a drive tube 66, a support 68, a pair of bearings 70, and a pair of lock collars 72. The sprocket 62 is mounted within the external gear box 28 on a rod 73 extending from the miter gear 52 so that the sprocket is drivably engaged to the PTO. The sprocket 63 is mounted on the drive shaft 22 within the drive tube 66 for driving the auger flight 24. The diameter of the sprocket 63 is less than the substantially constant diameter of the auger tube 20. The sprockets 62 and 63 may be a single or a double sprockets depending on the length of the auger tube 20. More particularly, single sprockets are used in combination with a single roller chain 64 with auger tubes having a length of between 31 to 36 feet. Double sprockets are used in combination with a double roller chain 64 with auger tubes having a length of between 41 and 66 feet. FIG. 2 illustrates the double sprockets and double roller chain arrangement.

The drive tube 66 extends perpendicularly into the auger tube 20 and seals the drive linkage 30 from the particulate material passing through the auger tube 20. The drive tube 66 is sealed within and to the auger tube 20 around the sprocket 63, roller chains 64 and auger drive shaft 22. One bearing 70 and one lock collar 72 are provided on each of the exterior sides of the drive tube 66 to securely mount the drive tube 66 around the auger drive shaft 22. The support 68 is welded between the bottom of the drive tube 66 and an interior surface of the auger tube 20 for additional support and bracing of the drive tube 66. The support 68 is positioned longitudinally in the auger tube 20 so as not to restrict the flow of particulate material. The diameter of the auger tube 20 is increased slightly around the drive linkage 30 to increase the flow of particulate material therethrough. In fact, the enclosed drive tube 66 and drive linkage 30 provides an increase in the volume of particulate material flowing through the drive area when compared to center drive augers having internal gear boxes.

In sum, the present invention provides a center drive portable auger system 10 having an external gear box 28 which prevents oil from leaking into the particulate material within the auger tube 20 and which runs cooler than internally located gear boxes. Additionally, the external gear box 28 and drive linkage 30 to the auger drive shaft 22 provide a reduced restriction of the volume passing through the drive area compared to internally positioned gear boxes. If the diameter of the auger tube 20 is increased in the drive area then there is actually an increase in the volume of particulate material flowing through such area.

Although the present invention has been described with reference to preferred embodiments, workers skilled in the art will recognize that changes may be made in form and detail without departing from the spirit and scope of the invention.

What is claimed is:

1. An auger for transporting particulate material, the auger comprising:

an auger tube having a feed end and a discharge end, and a substantially constant diameter;

an auger drive shaft disposed with the auger tube;

an auger flighting mounted to the auger drive shaft for transporting particulate material from the feed end to the discharge end of the auger tube;

a gear box positioned adjacent an external surface of the auger tube between the feed end and the discharge end of the auger tube such that the gear box does not restrict the flow of the particulate material within the auger tube, the gear box being connectable to an external power supply;

a drive linkage operable with the gear box and the auger drive shaft for driving the auger flighting, the drive linkage including a drive member mounted on the auger flighting and having a diameter less than the substantially constant diameter of the auger tube, the drive member being a sprocket mounted on the auger drive shaft between two sections of auger flighting and wherein the drive linkage further includes a drive chain extending between the sprocket and the external gear box.

2. The auger of claim 1, further comprising a drive tube extending perpendicularly into the auger tube and being sealed around the sprocket and to the auger tube such the particulate material cannot contact the drive chain or sprocket.

3. The auger of claim 2, wherein the drive tube includes a plurality of rectangular side walls.

4. The auger of claim 2, wherein the drive tube includes a curved bottom wall.

5. The auger of claim 2, further comprising an interior support connecting a bottom wall of the drive tube to an interior wall of the auger tube for supporting the drive tube against the flow of particulate material in the auger tube.

6. The auger of claim 5, wherein the interior support is positioned longitudinally within the auger tube so as not to restrict the flow of particulate material.

7. The auger of claim 1, wherein the auger flighting includes a first section mounted between the feed end of the auger tube and the drive means and a second section mounted between the drive means and the discharge end of the auger tube.

8. The auger of claim 1, wherein the diameter of the auger tube is increased around the drive linkage.

9. The auger of claim 1, further comprising a hopper mounted to the feed end of the auger tube.

10. In a center drive portable auger having an auger tube with a feed end and a discharge end and a substantially constant diameter, an auger drive shaft within the auger tube, an auger flighting mounted on the auger drive shaft for transporting particulate material from the feed end to the discharge end of the auger tube, and a center drive positioned between the feed end and the discharge end of the auger tube and operable with the auger drive shaft, the improvement being the center drive comprising a drive member mounted on the auger drive shaft and having a diameter less than the substantially constant diameter of the auger tube, an external gear box positioned outside of the auger tube and operable with the drive member such that oil in the gear box does not leak into particulate material in the auger tube, and a drive tube extending substantially perpendicularly into the auger drive tube and surrounding the drive member and linking the external gear box to the auger drive shaft such that the particulate material cannot contact the drive member, such that the gear box runs cooler than if the gear box was positioned inside the auger tube.

11. In the center drive portable auger of claim 10, wherein the drive member is a gear sprocket on the auger drive shaft.

12. In the center drive portable auger of claim 10, wherein the improvement further comprises a hopper mounted directly to the feed end of the auger tube.

13. An auger for transporting particulate material, the auger comprising:

an auger tube having a feed end and a discharge end;

an auger drive shaft disposed with the auger tube;

an auger flighting mounted to the auger drive shaft for transporting particulate material from the feed end to the discharge end of the auger tube;

an external gear box positioned adjacent an external surface of the auger tube between the feed end and the discharge end of the auger tube;

a drive linkage operable with the gear box and the auger drive shaft for driving the auger flighting, the drive linkage including a drive tube extending substantially perpendicularly into the auger tube and surrounding an exterior of a portion of the auger drive shaft; and an interior support connecting a bottom wall of the drive tube to an interior wall of the auger tube for supporting the drive tube against the flow of particulate material in the auger tube.

14. The auger of claim 13, wherein the drive linkage further includes a bearing arrangement operable between the drive tube and the auger drive shaft.

15. The auger of claim 13, wherein the drive linkage further includes a gear sprocket mounted on the auger drive shaft and having a diameter less than an average diameter of the auger tube, and a drive chain extending within the drive tube between the sprocket and the external gear box.

16. The auger of claim 13, wherein the drive tube includes a plurality of rectangular side walls and a curved bottom wall.

17. An auger for transporting particulate material, the auger comprising:

an auger tube having a feed end and a discharge end, and a substantially constant diameter;

an auger drive shaft disposed with the auger tube;

an auger flighting mounted to the auger drive shaft for transporting particulate material from the feed end to the discharge end of the auger tube;

a gear box positioned adjacent an external surface of the auger tube between the feed end and the discharge end of the auger tube such that the gear box does not restrict the flow of the particulate material within the auger tube, the gear box being connectable to an external power supply;

a drive linkage operable with the gear box and the auger drive shaft for driving the auger flighting, the drive linkage including a drive member mounted on the auger flighting and having a diameter less than the substantially constant diameter of the auger tube; and a drive tube extending perpendicularly into the auger tube and extending around the drive member for linking the external gear box to the auger drive shaft such that the particulate material cannot contact the drive linkage.

18. The auger of claim 17, wherein the diameter of the auger tube is increased around the drive linkage.

19. The auger of claim 17, further comprising a hopper mounted to the feed end of the auger tube.

* * * * *